United States Patent
Hirose et al.

(10) Patent No.: US 12,444,443 B2
(45) Date of Patent: Oct. 14, 2025

(54) SEMICONDUCTOR DEVICES HAVING STAGGERED CONDUCTIVE CONTACTS, AND ASSOCIATED SYSTEMS AND METHODS

(71) Applicant: Micron Technology, Inc., Boise, ID (US)

(72) Inventors: Yukitoshi Hirose, Kanagawa (JP); Yushi Inoue, Kanagawa (JP)

(73) Assignee: Micron Technology, Inc., Boise, ID (US)

( * ) Notice: Subject to any disclaimer, the term of this patent is extended or adjusted under 35 U.S.C. 154(b) by 165 days.

(21) Appl. No.: 18/111,207

(22) Filed: Feb. 17, 2023

(65) Prior Publication Data

US 2023/0282246 A1 Sep. 7, 2023

Related U.S. Application Data

(60) Provisional application No. 63/315,839, filed on Mar. 2, 2022.

(51) Int. Cl.
*G11C 5/06* (2006.01)
*H01L 25/18* (2023.01)
*H10B 80/00* (2023.01)

(52) U.S. Cl.
CPC ............ *G11C 5/06* (2013.01); *H01L 25/18* (2013.01); *H10B 80/00* (2023.02)

(58) Field of Classification Search
CPC .......... G11C 5/06; H01L 25/18; H01L 24/49; H01L 25/0657; H01L 2225/06506; H01L 2225/0651; H01L 2225/06562; H10B 80/00
See application file for complete search history.

(56) References Cited

U.S. PATENT DOCUMENTS

| | | | |
|---|---|---|---|
| 11,942,459 B2 * | 3/2024 | Tan | H01L 24/48 |
| 2006/0001180 A1 * | 1/2006 | Taggart | H01L 23/49838 |
| | | | 257/784 |
| 2006/0192300 A1 * | 8/2006 | Appel | H01L 23/66 |
| | | | 257/784 |
| 2019/0221240 A1 * | 7/2019 | Jeon | G06F 13/1689 |

* cited by examiner

*Primary Examiner* — Xiaochun L Chen
(74) *Attorney, Agent, or Firm* — Dorsey & Whitney LLP

(57) ABSTRACT

Semiconductor devices, such as memory devices, and associated systems and methods, are disclosed herein. A representative semiconductor device includes (i) a substrate having multiple conductive first contacts, (ii) a semiconductor die coupled to the substrate and having multiple conductive second contacts, and (iii) multiple wire bonds electrically coupling individual ones of the first contacts to corresponding ones of the second contacts. The first contacts, the second contacts, or both the first and second contacts can be arranged in a pair-staggered pattern. More specifically, the first contacts and/or the second contacts can extend sequentially along an axis of the semiconductor device, and adjacent pairs of the first contacts and/or adjacent pairs of the second contacts can be staggered relative to the axis.

18 Claims, 10 Drawing Sheets

SEMICONDUCTOR DEVICES HAVING STAGGERED CONDUCTIVE CONTACTS, AND ASSOCIATED SYSTEMS AND METHODS

CROSS-REFERENCE TO RELATED APPLICATION(S)

The present application claims priority to U.S. Provisional Patent Application No. 63/315,839, filed Mar. 2, 2022, the disclosure of which is incorporated herein by reference in its entirety.

TECHNICAL FIELD

The present disclosure generally relates to semiconductor devices, such as memory devices, having staggered conductive contacts for improved signaling performance and reduced size.

BACKGROUND

Memory packages or modules typically include multiple memory devices mounted on a substrate. Memory devices are widely used to store information related to various electronic devices such as computers, wireless communication devices, cameras, digital displays, and the like. Information is stored by programing different states of a memory cell. Various types of memory devices exist, including magnetic hard disks, random access memory (RAM), read only memory (ROM), dynamic RAM (DRAM), synchronous dynamic RAM (SDRAM), and others. Improving memory packages, generally, may include increasing memory cell density, increasing read/write speeds or otherwise reducing operational latency, increasing reliability, increasing data retention, reducing power consumption, reducing manufacturing costs, and reducing the size or footprint of the memory packages and/or components of the memory devices, among other metrics.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology.

DETAILED DESCRIPTION

Embodiments of the present technology are directed to semiconductor devices, such as memory devices, and associated systems and methods. In several of the embodiments described below, a representative semiconductor device includes (i) a substrate having multiple conductive first contacts, (ii) a semiconductor die coupled to the substrate and having multiple conductive second contacts, and (iii) multiple wire bonds electrically coupling individual ones of the first contacts to corresponding ones of the second contacts. The first contacts, the second contacts, or both the first and second contacts can be arranged in a pair-staggered pattern. More specifically, in such a pair-staggered pattern the first contacts and/or the second contacts can extend sequentially along an axis of the semiconductor device, and adjacent pairs of the first contacts and/or adjacent pairs of the second contacts can be staggered relative to the axis.

In some aspects of the present technology, arranging the first contacts and/or the second contacts (collectively "the contacts") in such a pair-staggered pattern can ensure that pairs of the contacts that transmit complementary data signals are coupled to wire bonds having the same length. This can reduce interference between the wire bonds and improve the signal quality of the data signals. In additional aspects of the present technology, staggering the contacts can reduce an overall pitch of the contacts—thereby reducing the overall size of the semiconductor device.

Numerous specific details are discussed to provide a thorough and enabling description of embodiments of the present technology. A person skilled in the art, however, will understand that the technology may have additional embodiments and that the technology may be practiced without several of the details of the embodiments described below with reference to FIGS. 1A-6. In other instances, well-known structures or operations often associated with semiconductor devices, memory devices, etc., are not shown, or are not described in detail, to avoid obscuring other aspects of the technology. In general, it should be understood that various other devices and systems in addition to those specific embodiments disclosed herein may be within the scope of the present technology.

As used herein, the terms "vertical," "lateral," "upper," "lower," "above," and "below" can refer to relative directions or positions of features in the semiconductor devices in view of the orientation shown in the Figures. For example, "upper" or "uppermost" can refer to a feature positioned closer to the top of a page than another feature. These terms, however, should be construed broadly to include semiconductor devices having other orientations, such as inverted or inclined orientations where top/bottom, over/under, above/below, up/down, and left/right can be interchanged depending on the orientation.

Figure 1A:
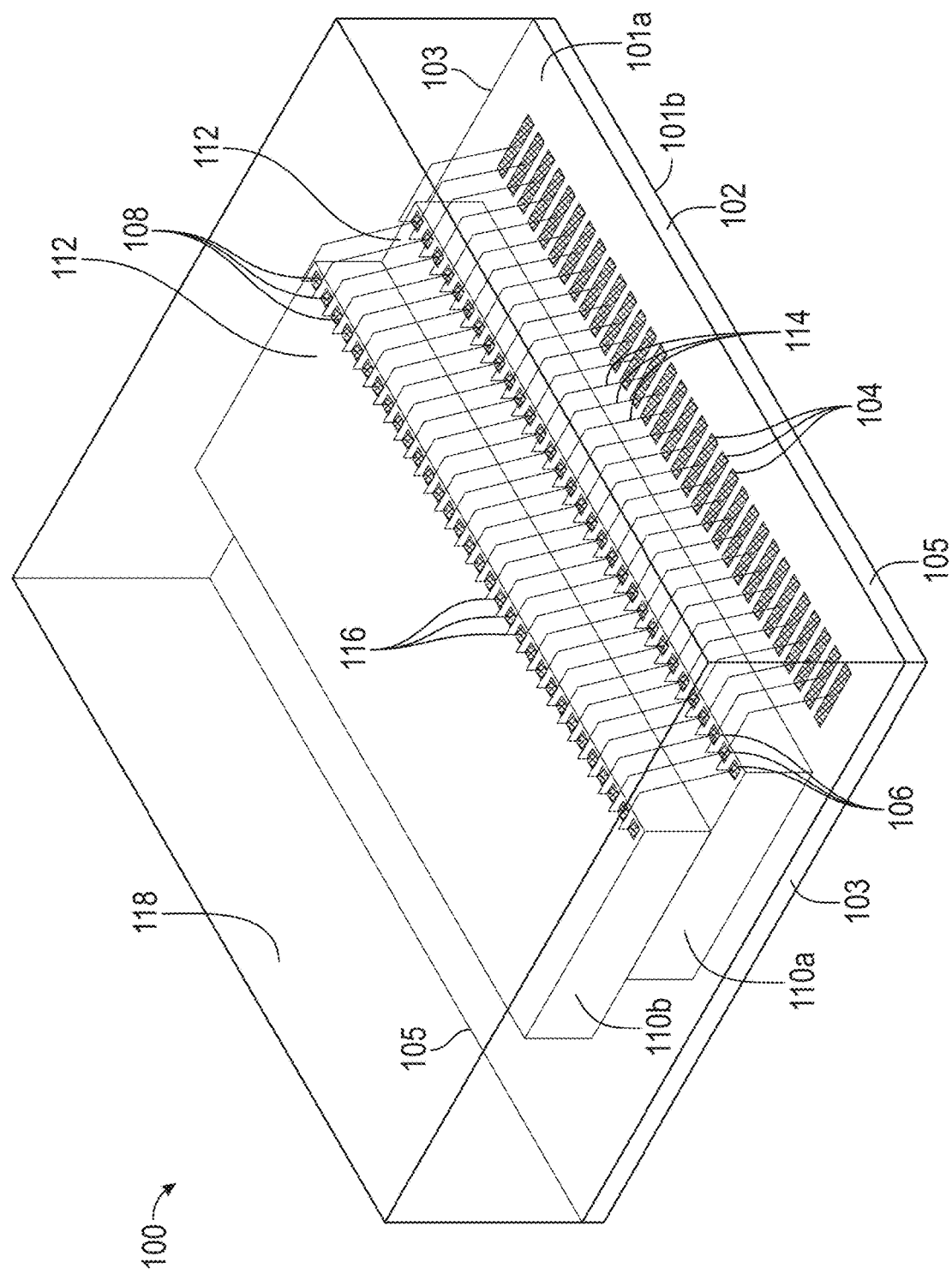
FIG. 1A is an isometric view of a semiconductor device in accordance with embodiments of the present technology.

FIG. 1A is an isometric view of a semiconductor device 100 in accordance with embodiments of the present technology. In the illustrated embodiment, the semiconductor device 100 includes a substrate 102 having a first side 101a (e.g., an upper side) and a second side 101b (e.g., a lower side). The substrate 102 carries a plurality of semiconductor dies 110 (identified individually as a first semiconductor die 110a and a second semiconductor die 110b). In some embodiments, the semiconductor device 100 is a memory device and the semiconductor dies 110 are memories. Accordingly, the semiconductor dies 110 can include one or more (e.g., multiple stacked) semiconductor components each including integrated memory circuitry and/or logic circuitry, which can include various types of semiconductor components and functional features, such as dynamic random-access memory (DRAM), static random-access memory (SRAM), flash memory (e.g., NAND and/or NOR), other forms of integrated circuit memory, processing circuits, and/or other semiconductor features. In some embodiments, the semiconductor dies 110 are identical (e.g., having the same design and specifications). In other embodiments, the semiconductor dies 110 can be different from one another (e.g., having different shapes, having different sizes, and/or including different types of memory components or different combinations of controller, logic, and/or memory components).

The substrate 102 can be a printed circuit board (PCB), an interposer, a dielectric spacer, a semiconductor die (e.g., a logic die), and/or or the like. In some embodiments, the substrate 102 has a generally rectilinear (e.g., rectangular, square) shape including opposing first edges 103 and opposing second edges 105. In the illustrated embodiment, the substrate 102 includes an array of multiple conductive contacts 104 arranged in a row extending between (e.g., extending orthogonally between) the first edges 103. The contacts 104 can be bond fingers, bond pads, and/or the like. In some embodiments, the second side 101b of the substrate 102 can be connected to electrical connectors (e.g., solder balls; obscured in FIG. 1A) configured to electrically couple the semiconductor device 100 to external circuitry (not shown). The substrate 102 can further include electrical lines, traces, and/or the like extending therethrough and/or thereacross that electrically connect the contacts 104 to the electrical connectors and external circuitry.

In the illustrated embodiment, the first semiconductor die 110a includes an array of multiple conductive contacts 106 arranged in a row extending between (e.g., extending orthogonally between) the first edges 103 of the substrate 102 and corresponding edges of the first semiconductor die 110a. Likewise, the second semiconductor die 110b includes an array of multiple conductive contacts 108 arranged in a row extending between (e.g., extending orthogonally between) the first edges 103 of the substrate 102 and corresponding edges of the second semiconductor die 110b. The number of the contacts 104 of the substrate 102, the number of the contacts 106 of the first semiconductor die 110a, and the number of the contacts 108 of the second semiconductor die 110b can be the same. In some embodiments, the contacts 104 of the substrate 102, the contacts 106 of the first semiconductor die 110a, and the contacts 108 of the second semiconductor die 110b (collectively "contacts 104-108") are each linearly arranged.

In the illustrated embodiment, the semiconductor dies 110 are arranged in a stack with (i) the first semiconductor die 110a positioned on and coupled to the substrate 102 and (ii) the second semiconductor die 110b positioned on and coupled to the first semiconductor die 110a. In some embodiments, the semiconductor dies 110 can be laterally offset from one another (e.g., in a direction extending between the second edges 105 of the substrate 102) such that the contacts 106 of the first semiconductor die 110a and the contacts 108 of the second semiconductor die 110b are exposed from the stack (e.g., at open portion or porch 112 of each of the semiconductor dies 110). Although two semiconductor dies 110 are shown in FIG. 1A, the semiconductor device 100 can include any number of the semiconductor dies 110 (e.g., one, three, or more than three of the semiconductor dies 110) arranged in such a stack. In other embodiments, the semiconductor 110 can be arranged/stacked differently, can have different shapes and/or dimensions, and so on.

In the illustrated embodiment, the semiconductor device 100 includes wire bonds 114 extending between and electrically coupling individual ones of the contacts 106 of the first semiconductor die 110a to corresponding ones of the contacts 104 of the substrate 102. Similarly, the semiconductor device 100 can include wire bonds 116 extending between and electrically coupling individual ones of the contacts 108 of the second semiconductor die 110b to corresponding ones of the contacts 106 of the first semiconductor die 110a.

In the illustrated embodiment, the semiconductor device 100 includes a molded material 118 over the first side 101a of the substrate 102 (shown as transparent in FIG. 1A for clarity). The molded material 118 can at least partially surround the semiconductor dies 110, the wire bonds 114, the wire bonds 116, and/or additional components of the semiconductor device 100 to protect one or more of these components from contaminants and/or physical damage. For example, in the illustrated embodiment the molded material 118 encapsulates (e.g., seals) the components of the semiconductor device 100 coupled to the first side 101a of the substrate 102. In some embodiments, the semiconductor device 100 includes additional passive or active electrical components (e.g., capacitors) supported by and/or electrically coupled to the substrate 102.

Figure 1B:
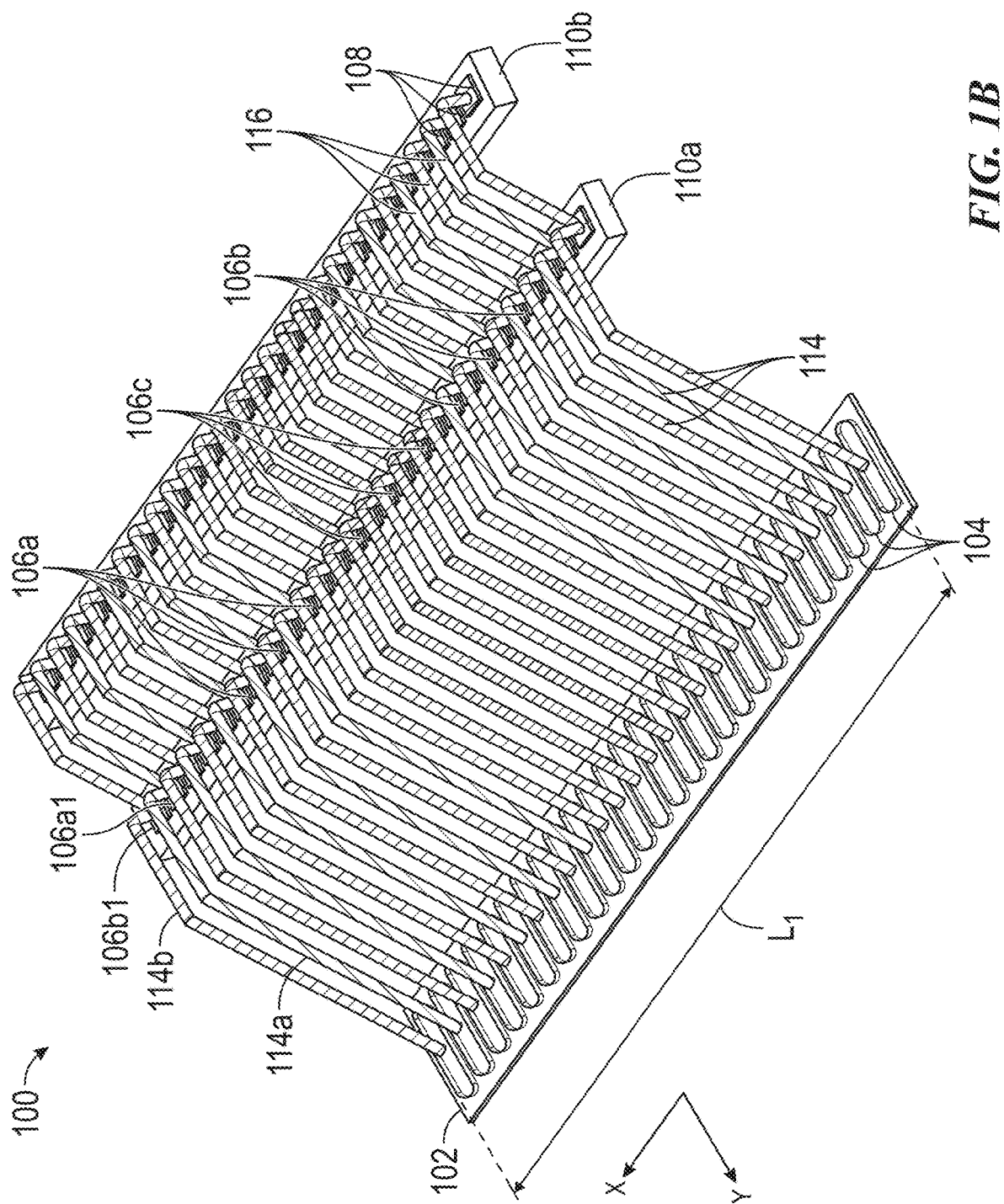
FIG. 1B is an enlarged, partially-schematic isometric view of a portion of the semiconductor device of FIG. 1A in accordance with embodiments of the present technology.
Figure 1C:
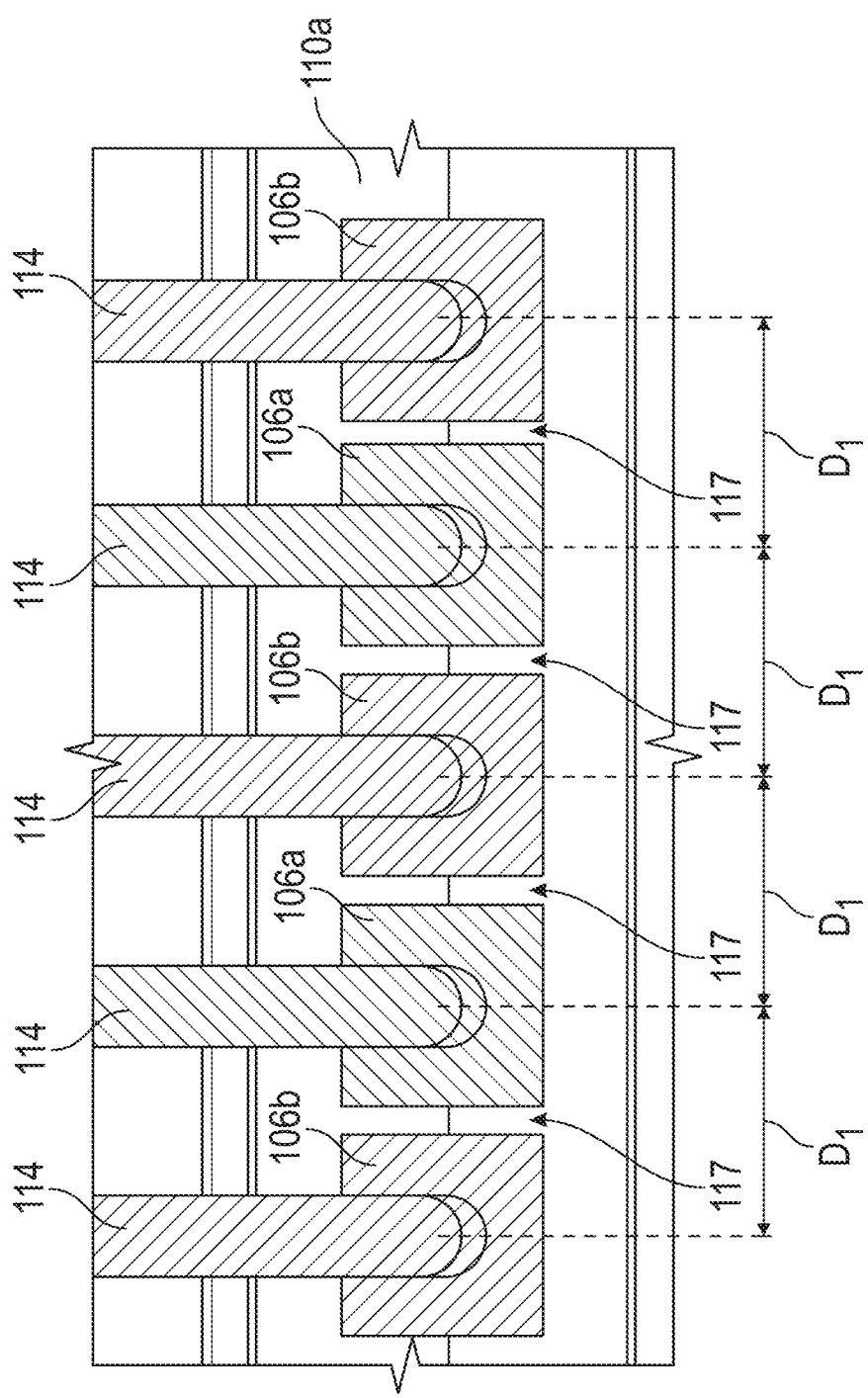
FIG. 1C is an enlarged top view of a portion of a semiconductor die of the semiconductor device of FIG. 1A in accordance with embodiments of the present technology.

FIG. 1B is an enlarged, partially-schematic isometric view of a portion of the semiconductor device 100 of FIG. 1A in accordance with embodiments of the present technology. FIG. 1C is an enlarged top view of a portion of the first semiconductor die 110a in accordance with embodiments of the present technology. Referring to FIGS. 1B and 1C together, individual ones of the contacts 106 of the first semiconductor die 110a can be electrically coupled to different electrical components of the first semiconductor die 110a. In the illustrated embodiment, for example, the contacts 106 can comprise first data signal contacts 106a, second data signal contacts 106b, and other contacts 106c (each illustrated by different shading). In some embodiments, the first and second data signal contacts 106a-b are coupled to corresponding memory elements (e.g., storage elements) within the first semiconductor die 110a and can receive and/or transmit (e.g., collectively "transfer") data signals (I/O signals) over the corresponding wire bonds 114 from and/or to the corresponding contacts 104 of the substrate 102. The data signals can comprise read/write signals, such as DQ, DMI, VSS, VDDQ, and/or other electrical signals.

The other contacts 106c can be electrically coupled to clock circuitry, power circuitry, address circuitry, and/or the like of the first semiconductor die 110a and can receive clock signals, power signals, address signals, and/or the like over the corresponding wire bonds 114 from/to the corresponding contacts 104 of the substrate 102. In some embodiments, the other contacts 106c can receive/transmit one or more of the following electrical signals: VDD1, VDD2H, VDDD2, VDD2L, RDQS, WCK, CA, CS, and CLK. The contacts 108 of the second semiconductor die 110b can be similarly or identically coupled to different circuitry of the second semiconductor die 110b.

In the illustrated embodiment, the first and second data signal contacts 106a-b are interleaved between/alternatingly placed relative to one another. In some embodiments, adjacent pairs of the first and second data signal contacts 106a-b can receive complementary data signals that, for example, provide an input and output path for a data signal comprising differing voltage levels. For example, as shown in FIG. 1B, a complementary pair of the first and second data signal contacts 106a-b can comprise one of the first data signal contacts 106a1 and one of the second data signal contacts 106b1. In some embodiments, the first data signal contact 106a1 can provide an input path for a data signal received over a corresponding one of the wire bonds 114 (identified individually as a first wire bond 114a) and the second data signal contact 106b1 can provide a return path for the data signal for transmission over a corresponding one of the wire bonds 114 (identified individually as a second wire bond 114b). In general, during operation of the semiconductor device 100, interference or crosstalk may occur between the corresponding wire bonds 114 of each pair of the first and second data signal contacts 106a-b due to the differing voltage signals on each of the wire bonds 114 (e.g., due to electrical differences between the return path and the transmit path of a data signal). For example, interference may occur between the first wire bond 114a and the second wire bond 114b corresponding to the complementary pair of the first data signal contact 106a1 and the second data signal contact 106b1. Similar interference can occur between the wire bonds 116 coupling the contacts 106 of the first semiconductor die 110a to the contacts 108 of the second semiconductor die 110b.

Referring to FIGS. 1A-1C together, in the illustrated embodiment the contacts 104-108 are each arranged linearly (e.g., side-by-side). That is, the contacts 104-108 extend sequentially along and parallel to, for example, an axis X (e.g., a first axis extending in a direction between the opposing second first edges 103 of the substrate 102) of the semiconductor device 100 and are not positioned differently relative to an axis Y (e.g., a second axis extending in a direction between the opposing second edges 105 of the substrate 102) of the semiconductor device 100 that is orthogonal to the axis X. Accordingly, each of the wire bonds 114 and the wire bonds 116 can have generally the same length. In some aspects of the present technology, this arrangement can minimize the interference between the wire bonds 114 and the wire bonds 116 coupled to each pair of the first and second data signal contacts 106a-b (e.g., interference between the first wire bond 114a and the second wire bond 114b) that may otherwise degrade the signals transmitted by the wire bonds 114 and the wire bonds 116 and introduce noise into the electrical operation of the semiconductor dies 110.

However, arranging the contacts 104-108 linearly can require a spacing between each of the contacts 104-108. FIG. 1C, for example, illustrates such a spacing 117 along the axis X (FIG. 1B) between each of the contacts 106 that results in a fixed separation distance $D_1$ between each of the contacts 106. In some embodiments, the distance $D_1$ can be about 50 microns. Accordingly, in some aspects of the present technology arranging the contacts 104-108 linearly can reduce the interference between the wire bonds 114 and the wire bonds 116 that receive/transmit data signals, but also results in a relatively long overall pitch or length (e.g., as indicated by a length $L_1$ in FIG. 1B) for each of the arrays of the contacts 104-108.

Figure 2A:
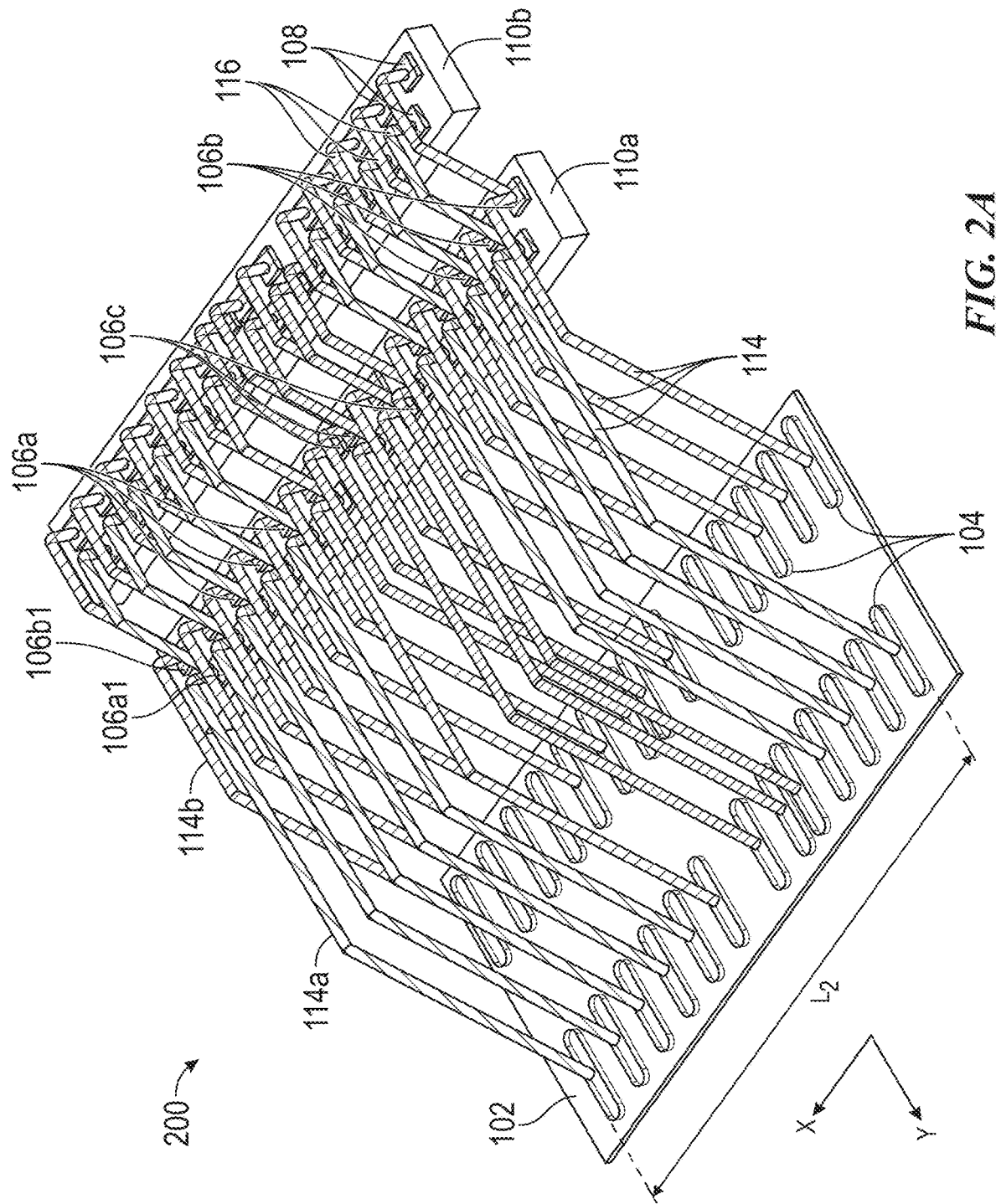
FIG. 2A is an enlarged, partially-schematic isometric view of a portion of a semiconductor device in accordance with additional embodiments of the present technology.
Figure 2B:
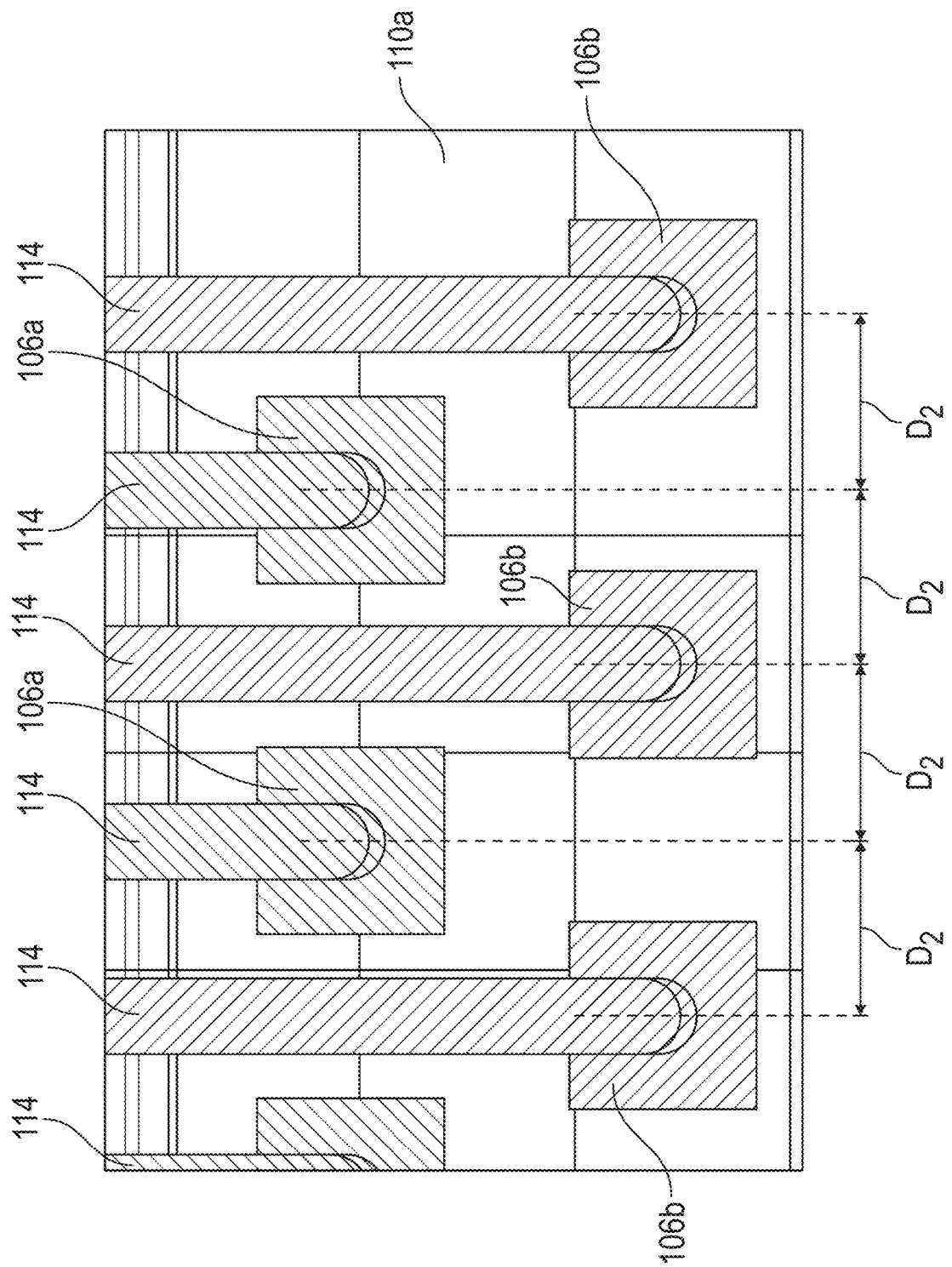
FIG. 2B is an enlarged top view of a portion of a semiconductor die of the semiconductor device of FIG. 2A in accordance with embodiments of the present technology.

FIG. 2A is an enlarged, partially-schematic isometric view of a portion of a semiconductor device 200 in accordance with additional embodiments of the present technology. The semiconductor device 200 includes the same components as the semiconductor device 100 described in detail with reference to FIGS. 1A-1C but, in the illustrated embodiment, the contacts 104-108 are arranged differently. FIG. 2B is an enlarged top view of a portion of the first semiconductor die 110a of the semiconductor device 200 in accordance with embodiments of the present technology. The views shown in FIGS. 2A and 2B can correspond to the views shown in FIGS. 1B and 1C, respectively.

Referring to FIGS. 2A and 2B together, in the illustrated embodiment the contacts 104-108 are each arranged in an alternatingly-staggered or a single-staggered pattern in which some or all of the alternating ones of the contacts 104-108 are positioned at different positions along the axis Y (FIG. 2A) of the semiconductor device 200. That is, the contacts 104-108 can extend sequentially relative to the axis X (FIG. 2A) while alternating ones of the contacts 104-108 are staggered relative to the axis X (e.g., having different positions along the axis Y). Put another way, the contacts 104-108 can each form two linear rows extending parallel to the axis X (FIG. 2A) with adjacent ones of the contacts 104-108 along the axis X being spaced apart along the axis Y. In the illustrated embodiment, each of the first and second data signal contacts 106a-b of the first semiconductor die 110a (and the corresponding ones of the contacts 104 of the substrate 102 and the contacts 108 of the second semiconductor die 110b) are arranged in such a staggered pattern while only some of the other contacts 106c are arranged in a single-staggered pattern. For example, some of the other contacts 106c toward a middle of the array can be linearly positioned relative to one another, or can be staggered in pairs relative to one another. In other embodiments, each of the contacts 104-108 can be arranged in a single-staggered pattern.

In the illustrated embodiment, alternating ones of the wire bonds 114 and the wire bonds 116 have different lengths due to the single-staggered pattern of the contacts 104-108. Accordingly, the wire bonds 114 coupled to complementary pairs of the contacts 106 of the first semiconductor die 110a that receive different complementary voltage signals (e.g., the first wire bond 114a and the second wire bond 114b coupled to the first data signal contact 106a1 and the second data signal contact 106b1, respectively) can have differing lengths. Likewise, the wire bonds 116 coupled to complementary pairs of the contacts 108 of the second semiconductor die 110b that receive different complementary voltage signals can also have different lengths. In some aspects of the present technology, this can increase the interference between the wire bonds 114 and the wire bonds 116—thereby degrading the signals transmitted by the wire bonds 114 and the wire bonds 116 and introducing noise into the electrical operation of the semiconductor dies 110.

However, arranging the contacts 104-108 in such a single-staggered pattern allows the substrate 102 and the semiconductor dies 110 to be manufactured without a spacing or separation between the contacts 104-108 along the axis X (e.g., manufactured without the spacings 117 shown in FIG. 1C). For example, as shown in FIG. 2B, the contacts 106 are not spaced apart from one another along the axis X such that each of the contacts 106 is separated by a minimum distance $D_2$. The distance $D_2$ is less than the distance $D_1$ shown in FIG. 1C and can be about 40 microns. Accordingly, in some aspects of the present technology arranging the contacts 104-108 in a single-staggered pattern can reduce the overall pitch or length (e.g., to a minimum value; indicated by a length $L_2$ in FIG. 2A) for each of the arrays of contacts 104-108 but can also increase the interference between the wire bonds 114 and the wire bonds 116 that receive/transmit data signals. Minimizing the lengths of the arrays of contacts 104-108 can reduce the overall footprint and size of the semiconductor device 200.

Figure 3A:
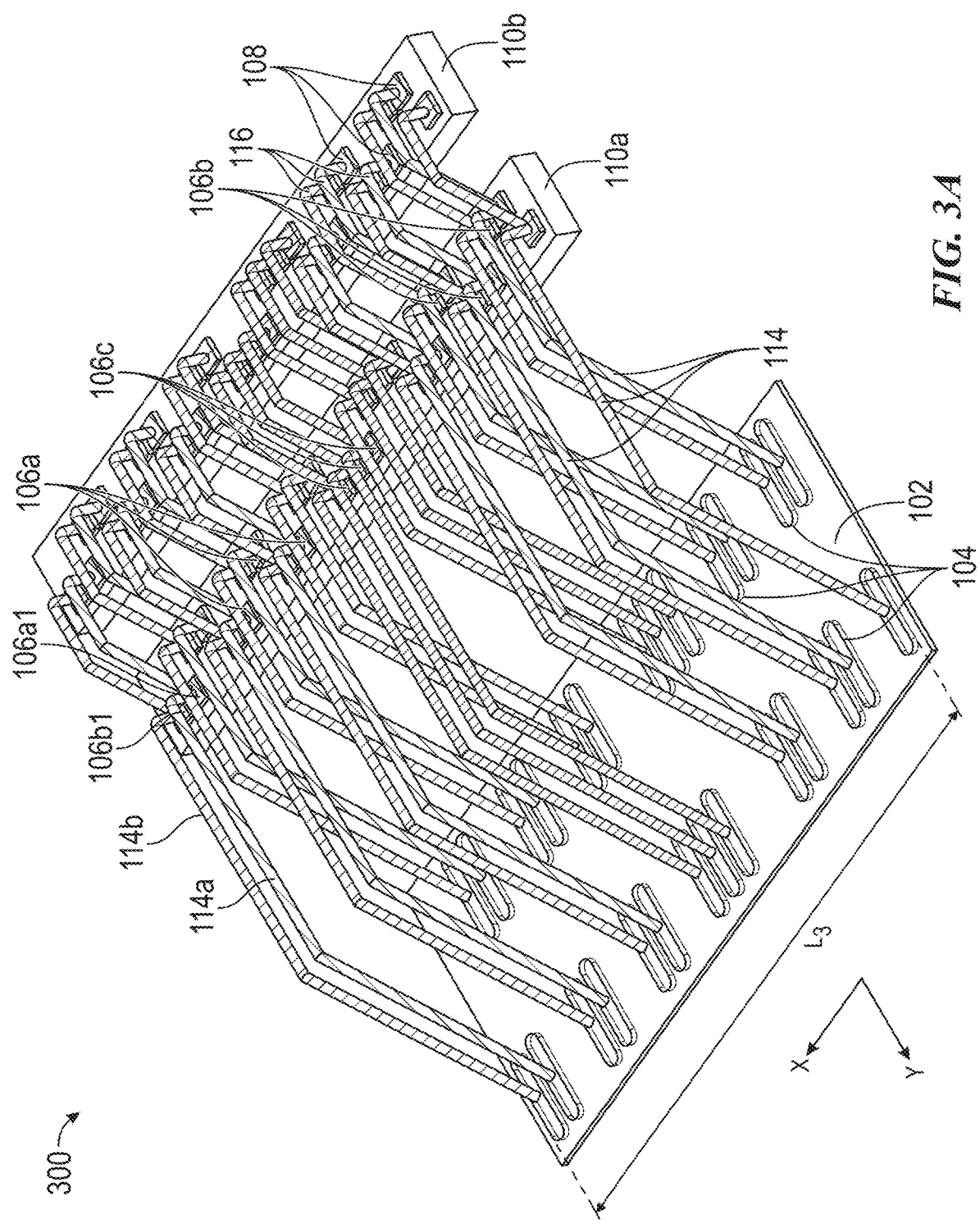
FIG. 3A is an enlarged, partially-schematic isometric view of a portion of a semiconductor device in accordance with additional embodiments of the present technology.
Figure 3B:
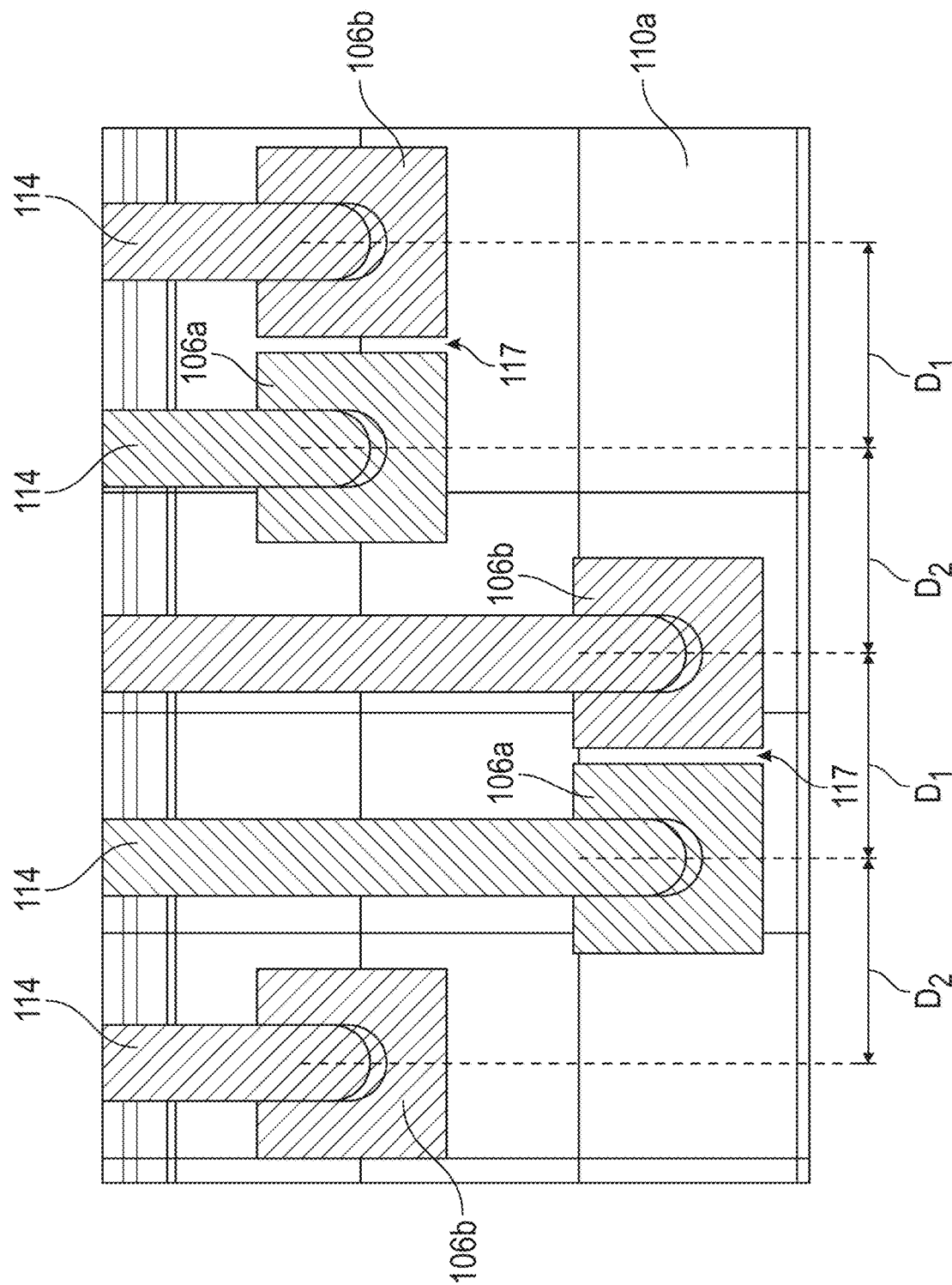
FIG. 3B is an enlarged top view of a portion of a semiconductor die of the semiconductor device of FIG. 3A in accordance with embodiments of the present technology.

FIG. 3A is an enlarged, partially-schematic isometric view of a portion of a semiconductor device 300 in accordance with additional embodiments of the present technology. The semiconductor device 300 includes the same components as the semiconductor device 100 and the semiconductor device 200 described in detail with reference to FIGS. 1A-2B but, in the illustrated embodiment, the contacts 104-108 are arranged differently. FIG. 3B is an enlarged top view of a portion of the first semiconductor die 110a of the semiconductor device 300 in accordance with embodiments of the present technology. The views shown in FIGS. 3A and 3B can correspond to the views shown in FIGS. 1B and 1C, respectively, and the views shown in FIGS. 2A and 2B, respectively.

Referring to FIGS. 3A and 3B together, in the illustrated embodiment the contacts 104-108 are each arranged in a pair-staggered pattern in which at least some alternating pairs of the contacts 104-108 are positioned at different positions along the axis Y (FIG. 3A) of the semiconductor device 300. That is, the contacts 104-108 can extend sequentially relative to the axis X (FIG. 3A) with alternating adjacent pairs of the contacts 104-108 being staggered relative to the axis X (e.g., having different positions along the axis Y). Put another way, the contacts 104-108 can each form two linear rows extending parallel to the axis X with adjacent pairs of the contacts 104-108 along the axis X being spaced apart along the axis Y. In the illustrated embodiment, each of the first and second data signal contacts 106a-b of the first semiconductor die 110a (and the corresponding ones of the contacts 104 of the substrate 102 and the contacts 108 of the second semiconductor die 110b) are arranged in such a pair-staggered pattern, while only some of the other contacts 106c (and the corresponding ones of the contacts 104 of the substrate 102 and the contacts 108 of the second semiconductor die 110b) are arranged in a pair-staggered pattern. In other embodiments, each of the contacts 104-108 can be arranged in a pair-staggered pattern, or the other contacts 106c (and the corresponding ones of the contacts 104 of the substrate 102 and the contacts 108 of the second semiconductor die 110b) can be arranged in a single-staggered pattern as shown in, for example, FIGS. 2A and 2B.

In the illustrated embodiment, alternating pairs of the wire bonds 114 and alternating pairs of the wire bonds 116 have different lengths due to the pair-staggered pattern of the contacts 104-108. In some embodiments, the wire bonds 114 coupled to complementary pairs of the contacts 106 of the first semiconductor die 110a that receive different complementary voltage signals (e.g., the first wire bond 114a and the second wire bond 114b coupled to the first data signal contact 106a1 and the second data signal contact 106b1, respectively) can have the same length due to the pair-staggered pattern of the contacts 106. Likewise, the wire bonds 116 coupled to complementary pairs of the contacts 108 of the second semiconductor die 110b that receive different complementary voltage signals can also have the same length. In some aspects of the present technology, this can reduce the interference between the wire bonds 114 and the wire bonds 116—thereby improving the integrity of the signals transmitted by the wire bonds 114 and the wire bonds 116 as described in detail above with reference to FIGS. 1A-1C.

Arranging the contacts 104-108 in such a pair-staggered pattern (i) requires a spacing along the axis X between individual ones of the contacts 104-108 in the same pair but (ii) does not require a spacing along the axis X between the staggered pairs of the contacts 104-108. For example, as shown in FIG. 3B, the contacts 106 include the spacing 117 between the first and second data signal contacts 106a-b in each staggered pair such that the first and second data signal contacts 106a-b in each staggered pair are separated by the distance $D_1$. Moreover, the adjacent pairs of the contacts 106 are not spaced apart from one another along the axis X such that adjacent ones of the contacts 106 between the pairs are separated by the minimum distance $D_2$ less than the distance $D_1$. Accordingly, in some aspects of the present technology arranging the contacts 104-108 in a pair-staggered pattern can (i) reduce the overall pitch or length (e.g., indicated by a length $L_3$ in FIG. 3A) for each of the arrays of contacts 104-108 compared to arranging the contacts 104-108 linearly as shown in FIGS. 1A-1C and (ii) increase the overall length or pitch for each of the arrays of contacts 104-108 compared to arranging the contacts 104-108 in a single-staggered pattern as shown in FIGS. 2A and 2B. That is, referring to FIGS. 1A-3B together, the length $L_3$ can be less than the length $L_1$ but greater than the length $L_2$. In some embodiments, the length $L_3$ is about 5%-15% (e.g., about 9%) less than the length $L_1$ and the length $L_2$ is about 15%-25% (e.g., about 19%) less than the length $L_1$.

Figure 4A:
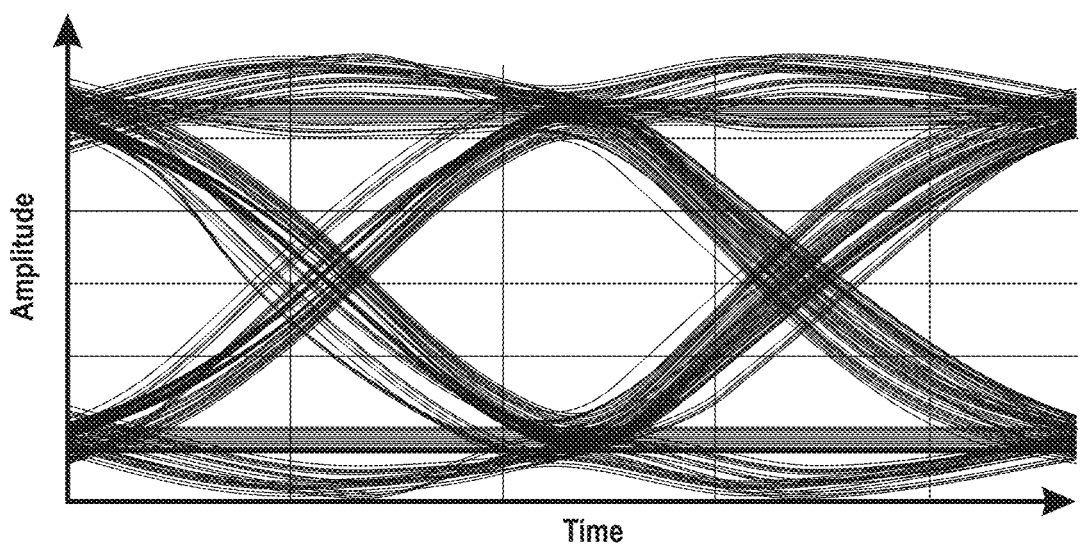
FIGS. 4A-4C are plots of signal amplitude over time for a data signal contact of a semiconductor die in the semiconductor device of FIGS. 1A-1C, the semiconductor device of FIGS. 2A and 2B, and the semiconductor device of FIGS. 3A and 3B, respectively, during operation in accordance with embodiments of the present technology.
Figure 4B:
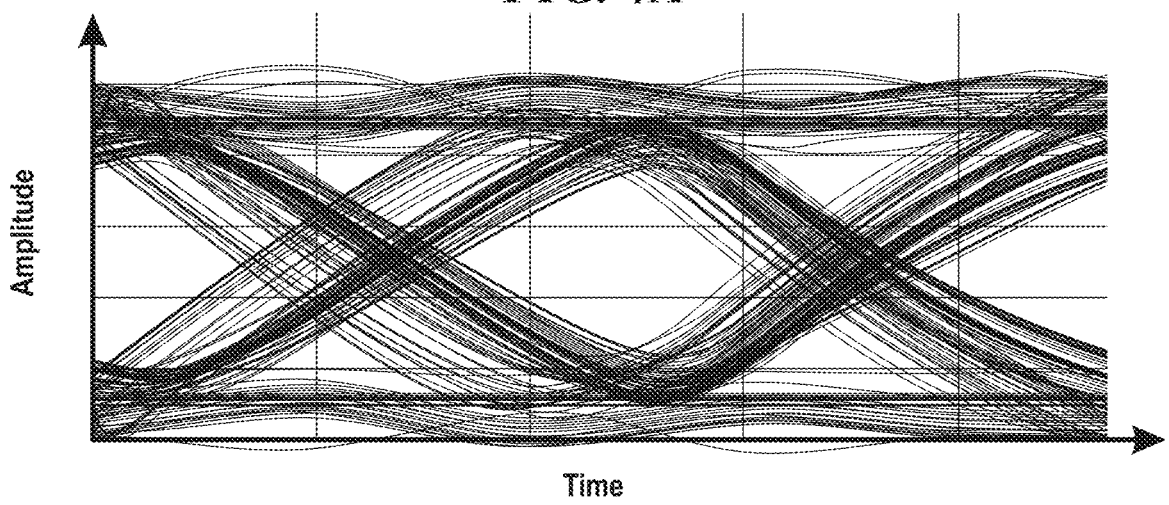
Figure 4C:
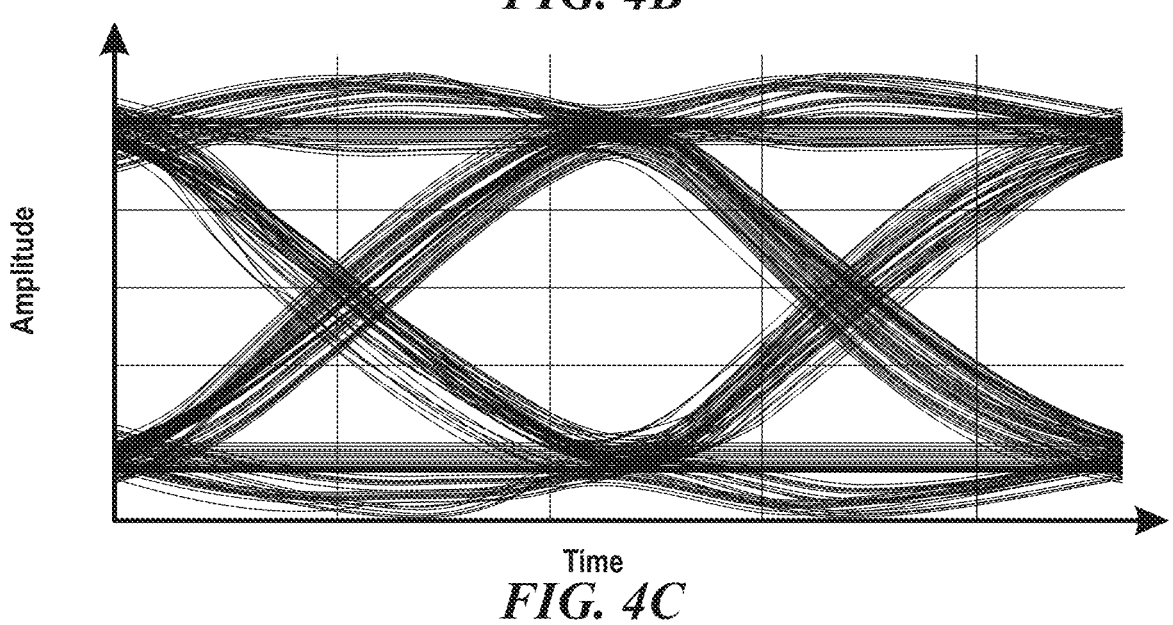

However, the pair-staggered arrangement of the contacts 104-108 shown in FIGS. 3A and 3B can also reduce the interference between the wire bonds 114 and the wire bonds 116 that receive/transmit data signals as compared to the single-staggered arrangement shown in FIGS. 2A and 2B. More specifically, for example, FIGS. 4A-4C are plots of signal amplitude over time for one of the first data signal contacts 106a and/or one of the second data signal contacts 106b of the first semiconductor die 110a in the semiconductor device 100 of FIGS. 1A-1C, the semiconductor device 200 of FIGS. 2A and 2B, and the semiconductor device 300 of FIGS. 3A and 3B, respectively, during operation and in accordance with embodiments of the present technology. Referring to FIGS. 4A-4C together, each of the plots illustrates multiple transitions of the data signal contact from a high to low voltage, such as during a data read or write operation. Notably, FIG. 4B illustrates a noisier signal than that of FIGS. 4A and 4C due to the differing lengths of the wire bonds 114 coupled to each complementary pair of the contacts 106 that receive different complementary voltage signals.

Figure 5:
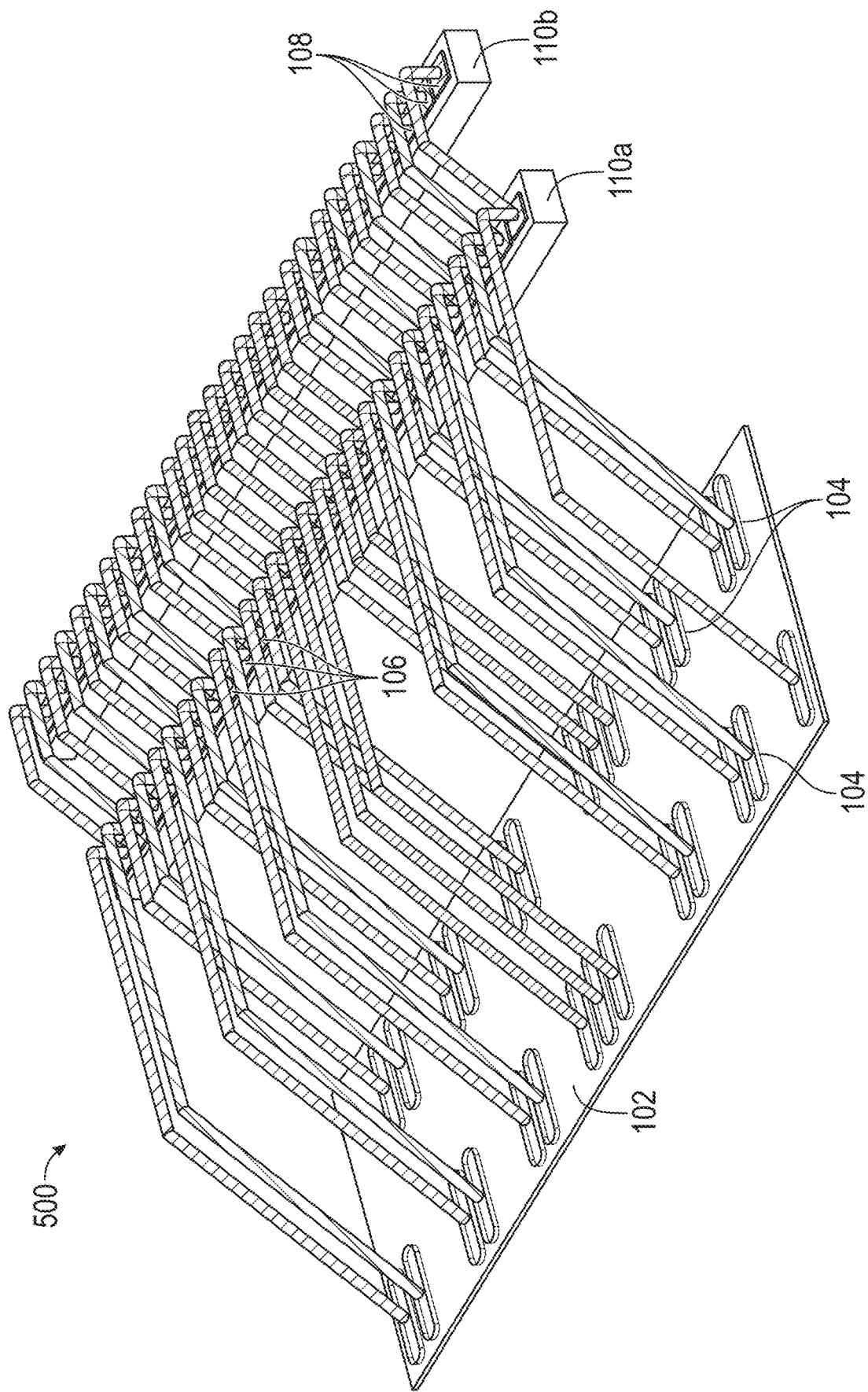
FIG. 5 is an enlarged, partially-schematic isometric view of a portion of a semiconductor device in accordance with additional embodiments of the present technology.

Referring to FIGS. 1A-3B together, in some embodiments the contacts 104-108 need not have the same arrangement as one another and can have different combinations of the illustrated arrangements, such as linearly arranged (FIGS. 1A-1C), single staggered (FIGS. 2A and 2B), and/or pair staggered (FIGS. 3A and 3B). For example, FIG. 5 is an enlarged, partially-schematic isometric view of a portion of a semiconductor device 500 in accordance with additional embodiments of the present technology. The semiconductor device 500 includes the same components as the semiconductor devices 100-300 described in detail with reference to FIGS. 1A-3C but, in the illustrated embodiment, the contacts 104-108 are arranged differently. More specifically, the contacts 104 of the substrate 102 are arranged in a pair-staggered manner while the contacts 106 of the first semiconductor die 100a and the contacts 108 of the second semiconductor die 110b are both arranged linearly.

In other embodiments, (i) the contacts 104 of the substrate 102 can be arranged linearly while the contacts 106 of the first semiconductor die 100a and the contacts 108 of the second semiconductor die 110b are arranged in a pair-staggered pattern, (ii) the contacts 104 of the substrate 102 can be arranged in pair-staggered pattern while the contacts 106 of the first semiconductor die 100a and the contacts 108 of the second semiconductor die 110b are arranged in a single-staggered pattern, (iii) the contacts 104 of the substrate 102 and the contacts 106 of the first semiconductor die 100a can be arranged in a pair-staggered pattern while the contacts 108 of the second semiconductor die 110b are arranged linearly, (iv) and so on. Moreover, in other embodiments a semiconductor device in accordance with embodiments of the present technology can include only the first semiconductor die 110a or more than the two illustrated semiconductor dies 110. Where the semiconductor device includes more than two of the semiconductor dies 110, each of the semiconductor dies 110 can have an array of contacts arranged in a linear, single-staggered, and/or pair-staggered pattern.

Figure 6:
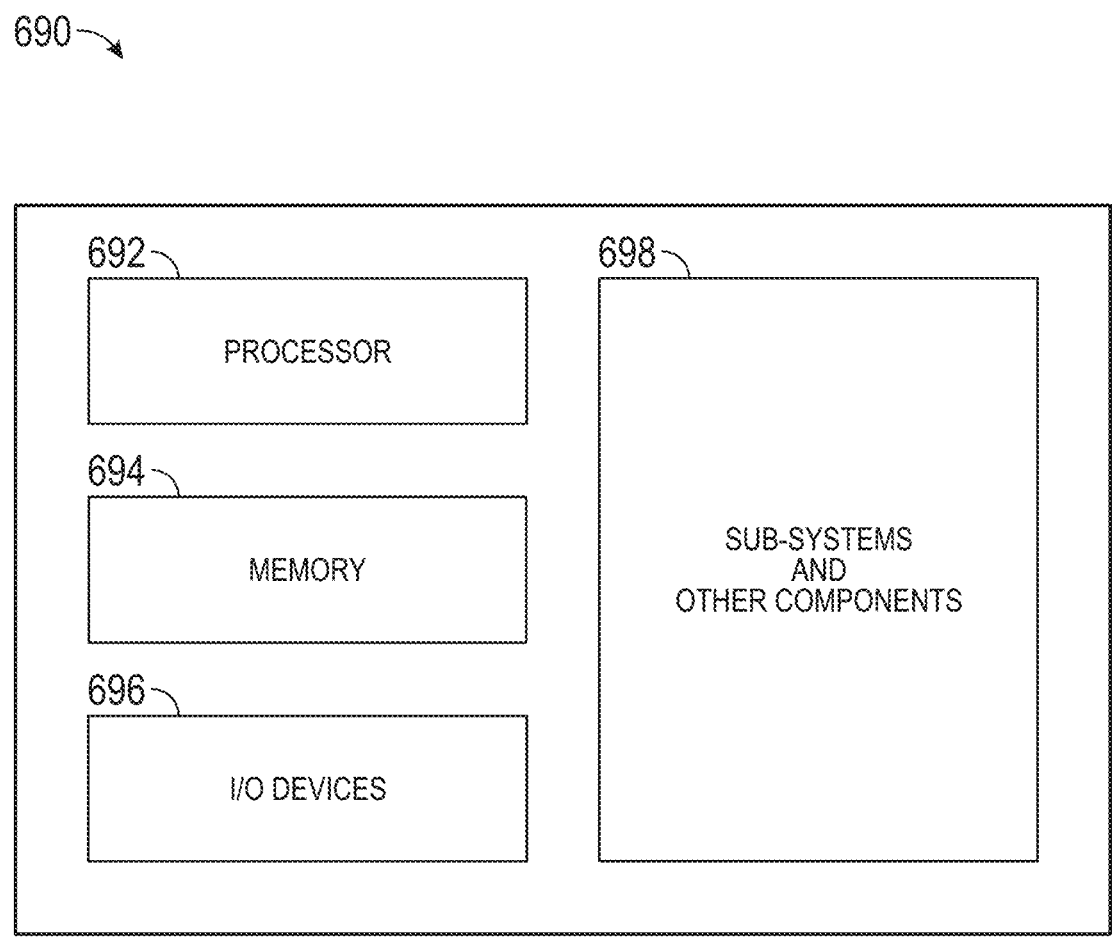
FIG. 6 is a schematic view showing a system that includes a semiconductor device assembly configured in accordance with an embodiment of the present technology.

The semiconductor device 100 described in detail above with reference to FIGS. 1A-5 and/or packages incorporating the semiconductor device 100 can be incorporated into any of a myriad of larger and/or more complex systems, a representative example of which is system 690 shown schematically in FIG. 6. The system 690 can include a processor 692, a memory 694 (e.g., SRAM, DRAM, NAND, flash, and/or other memory devices), input/output devices 696, and/or other subsystems or components 698. The memory devices and/or packages described above with reference to FIGS. 1A-5 can be included in any of the elements shown in FIG. 6. The resulting system 690 can be configured to perform any of a wide variety of suitable computing, processing, storage, sensing, imaging, and/or other functions. Accordingly, representative examples of the system 690 include, without limitation, computers and/or other data processors, such as desktop computers, laptop computers, Internet appliances, hand-held devices (e.g., palm-top computers, wearable computers, cellular or mobile phones, personal digital assistants, music players, and so on), tablets, multi-processor systems, processor-based or programmable consumer electronics, network computers, and minicomputers. Additional representative examples of the system 690 include lights, cameras, vehicles, etc. With regard to these and other example, the system 690 can be housed in a single unit or distributed over multiple interconnected units, for example, through a communication network. The components of the system 690 can accordingly include local and/or remote memory storage devices and any of a wide variety of suitable computer-readable media.

The following examples are illustrative of several embodiments of the present technology:

1. A semiconductor device, comprising:
   a substrate having multiple conductive first contacts, wherein the first contacts extend sequentially along an axis of the semiconductor device, and wherein adjacent pairs of the first contacts are staggered relative to the axis;
   a semiconductor die coupled to the substrate and having multiple conductive second contacts; and
   multiple wire bonds electrically coupling individual ones of the first contacts to corresponding ones of the second contacts.

2. The semiconductor device of example 1 wherein the second contacts are configured to transfer data signals over the wire bonds.

3. The semiconductor device of example 1 or example 2 wherein the semiconductor die is a memory die including multiple memory storage elements.

4. The semiconductor device of example 3 wherein individual ones of the second contacts are electrically coupled to corresponding ones of the memory storage elements.

5. The semiconductor device of any one of examples 1-4 wherein the first contacts in each of the pairs are configured to transfer a complementary data signal over the corresponding ones of the wire bonds to and/or from the corresponding ones of the second contacts.

6. The semiconductor device of any one of examples 1-5 wherein a first one of the first contacts in each of the pairs is configured to transmit a data input signal over the corresponding one of the wire bonds to the corresponding one of the second contacts, and wherein a second one of the first contacts in each of the pairs is configured to receive a data output signal from the corresponding one of the wire bonds from the corresponding one of the second contacts.

7. The semiconductor device of any one of examples 1-6 wherein the first contacts in each of the pairs are spaced apart from one another along the axis.

8. The semiconductor device of any one of examples 1-7 wherein each pair of the first contacts is not spaced apart from a directly adjacent pair of the first contacts along the axis.

9. The semiconductor device of any one of examples 1-8 wherein the wire bonds electrically coupled to each pair of the first contacts have an equal length.

10. The semiconductor device of any one of examples 1-9 wherein the second contacts extend sequentially along the axis of the semiconductor device, and wherein adjacent pairs of the second contacts are staggered relative to the axis.

11. The semiconductor device of example 10 wherein a number of the second contacts is equal to a number of the first contacts.

12. The semiconductor device of any one of examples 1-9 wherein the second contacts extend linearly along the axis of the semiconductor device.

13. The semiconductor device of any one of examples 1-9 wherein the second contacts extend sequentially along the axis of the semiconductor device, and wherein alternating ones of the second contacts are staggered relative to the axis.

14. The semiconductor device of any one of examples 1-13 wherein the semiconductor die is a first semiconductor die, wherein the wire bonds are first wire bonds, and further comprising:
   a second semiconductor stacked over the first semiconductor, wherein the second semiconductor die includes multiple third conductive contacts; and
   multiple second wire bonds electrically coupling individual ones the second contacts to corresponding ones of the third contacts.

15. The semiconductor device of example 14 wherein the second contacts extend sequentially along the axis of the semiconductor device, wherein adjacent pairs of the second contacts are staggered relative to the axis, wherein the third contacts extend sequentially along the axis, and wherein adjacent pairs of the third contacts are staggered relative to the axis.

16. A semiconductor device, comprising:
a substrate having multiple conductive first contacts;
a semiconductor die coupled to the substrate and having multiple conductive second contacts, wherein the second contacts extend sequentially along an axis of the semiconductor device, and wherein adjacent pairs of the second contacts are staggered relative to the axis; and
multiple wire bonds electrically coupling individual ones of the first contacts to corresponding ones of the second contacts.

17. The semiconductor device of example 16 wherein the semiconductor die is a memory die including multiple memory storage elements, and wherein individual ones of the second contacts are electrically coupled to corresponding ones of the memory storage elements.

18. The semiconductor device of example 16 or example 17 wherein the wire bonds electrically coupled to each pair of the second contacts have an equal length.

19. A semiconductor device, comprising:
a substrate having multiple conductive first contacts, wherein the first contacts extend sequentially along an axis of the semiconductor device, and wherein adjacent pairs of the first contacts are staggered relative to the axis;
a first semiconductor die coupled to the substrate and having multiple conductive second contacts;
a second semiconductor die stacked over the first semiconductor die and having multiple conductive third contacts;
multiple first wire bonds electrically coupling individual ones of the first contacts to corresponding ones of the second contacts; and
multiple second wire bonds electrically coupling individual ones of the second contacts to corresponding ones of the third contacts.

20. The semiconductor device of example 19 wherein the second contacts extend sequentially along the axis of the semiconductor device, wherein adjacent pairs of the second contacts are staggered relative to the axis, wherein the third contacts extend sequentially along the axis, and wherein adjacent pairs of the third contacts are staggered relative to the axis.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, other embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. To the extent any materials incorporated herein by reference conflict with the present disclosure, the present disclosure controls. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:
1. A semiconductor device, comprising:
a substrate having multiple conductive first contacts, wherein
the first contacts extend sequentially along an axis of the semiconductor device,
adjacent ones of the first contacts form a pair,
alternating adjacent ones of the pairs of the first contacts are staggered relative to the axis,
the first contacts in each of the pairs are spaced apart from one another along the axis by a first distance, and
each pair of the first contacts is spaced apart from a directly adjacent pair of the first contacts along the axis by a second distance less than the first distance;
a semiconductor die coupled to the substrate and having multiple conductive second contacts; and
multiple wire bonds electrically coupling individual ones of the first contacts to corresponding ones of the second contacts.

2. The semiconductor device of claim 1 wherein the second contacts are configured to transfer data signals over the wire bonds.

3. The semiconductor device of claim 1 wherein the semiconductor die is a memory die including multiple memory storage elements.

4. The semiconductor device of claim 3 wherein individual ones of the second contacts are electrically coupled to corresponding ones of the memory storage elements.

5. The semiconductor device of claim 1 wherein the first contacts in each of the pairs are configured to transfer a complementary data signal over the corresponding ones of the wire bonds to and/or from the corresponding ones of the second contacts.

6. The semiconductor device of claim 1 wherein a first one of the first contacts in each of the pairs is configured to transmit a data input signal over the corresponding one of the wire bonds to the corresponding one of the second contacts, and wherein a second one of the first contacts in each of the pairs is configured to receive a data output signal from the corresponding one of the wire bonds from the corresponding one of the second contacts.

7. The semiconductor device of claim 1 wherein the wire bonds electrically coupled to each pair of the first contacts have an equal length.

8. The semiconductor device of claim 1 wherein the second contacts extend sequentially along the axis of the semiconductor device, wherein adjacent ones of the second contacts form a pair, and wherein alternating adjacent ones of the pairs of the second contacts are staggered relative to the axis.

9. The semiconductor device of claim 8 wherein a number of the second contacts is equal to a number of the first contacts.

10. The semiconductor device of claim 1 wherein the second contacts extend linearly along the axis of the semiconductor device.

11. The semiconductor device of claim 1 wherein the second contacts extend sequentially along the axis of the semiconductor device, and wherein alternating ones of the second contacts are staggered relative to the axis.

12. The semiconductor device of claim 1 wherein the semiconductor die is a first semiconductor die, wherein the wire bonds are first wire bonds, and further comprising:
   a second semiconductor stacked over the first semiconductor, wherein the second semiconductor die includes multiple third conductive contacts; and
   multiple second wire bonds electrically coupling individual ones the second contacts to corresponding ones of the third contacts.

13. The semiconductor device of claim 12 wherein the second contacts extend sequentially along the axis of the semiconductor device, wherein adjacent ones of the second contacts form a pair, wherein alternating adjacent ones of the pairs of the second contacts are staggered relative to the axis, wherein the third contacts extend sequentially along the axis, wherein adjacent ones of the third contacts form a pair, and wherein alternating adjacent ones of the pairs of the third contacts are staggered relative to the axis.

14. A semiconductor device, comprising:
   a substrate having multiple conductive first contacts;
   a semiconductor die coupled to the substrate and having multiple conductive second contacts, wherein
      the second contacts extend sequentially along an axis of the semiconductor device,
      adjacent ones of the second contacts form a pair,
      alternating adjacent ones of the pairs of the second contacts are staggered relative to the axis,
      the second contacts in each of the pairs are spaced apart from one another along the axis by a first distance, and
      each pair of the second contacts is spaced apart from a directly adjacent pair of the second contacts along the axis by a second distance less than the first distance; and
   multiple wire bonds electrically coupling individual ones of the first contacts to corresponding ones of the second contacts.

15. The semiconductor device of claim 14 wherein the semiconductor die is a memory die including multiple memory storage elements, and wherein individual ones of the second contacts are electrically coupled to corresponding ones of the memory storage elements.

16. The semiconductor device of claim 14 wherein the wire bonds electrically coupled to each pair of the second contacts have an equal length.

17. A semiconductor device, comprising:
   a substrate having multiple conductive first contacts, wherein
      the first contacts extend sequentially along an axis of the semiconductor device,
      adjacent ones of the first contacts form a pair,
      wherein alternating adjacent ones of the pairs of the first contacts are staggered relative to the axis,
      the first contacts in each of the pairs are spaced apart from one another along the axis by a first distance, and
      each pair of the first contacts is spaced apart from a directly adjacent pair of the first contacts along the axis by a second distance less than the first distance;
   a first semiconductor die coupled to the substrate and having multiple conductive second contacts;
   a second semiconductor die stacked over the first semiconductor die and having multiple conductive third contacts;
   multiple first wire bonds electrically coupling individual ones of the first contacts to corresponding ones of the second contacts; and
   multiple second wire bonds electrically coupling individual ones of the second contacts to corresponding ones of the third contacts.

18. The semiconductor device of claim 17 wherein the second contacts extend sequentially along the axis of the semiconductor device, wherein adjacent ones of the second contacts form a pair, wherein alternating adjacent ones of the pairs of the second contacts are staggered relative to the axis, wherein the third contacts extend sequentially along the axis, wherein adjacent ones of the third contacts form a pair, and wherein alternating adjacent ones of the pairs of the third contacts are staggered relative to the axis.

* * * * *